United States Patent
De Rosa et al.

(10) Patent No.: US 9,565,510 B2
(45) Date of Patent: Feb. 7, 2017

(54) COORDINATING WIRELESS COMMUNICATION NETWORK ACCESS VIA MULTIPLE LOGIC CAPABLE DATABASES

(71) Applicant: AT&T Mobility II LLC, Atlanta, GA (US)

(72) Inventors: Giuseppe De Rosa, Atlanta, GA (US); Arthur Richard Brisebois, Cumming, GA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 57 days.

(21) Appl. No.: 14/724,516

(22) Filed: May 28, 2015

(65) Prior Publication Data
US 2016/0353225 A1 Dec. 1, 2016

(51) Int. Cl.
H04W 4/00 (2009.01)
H04W 4/16 (2009.01)
H04W 8/22 (2009.01)
H04W 88/06 (2009.01)

(52) U.S. Cl.
CPC .............. H04W 4/001 (2013.01); H04W 8/22 (2013.01); H04W 88/06 (2013.01)

(58) Field of Classification Search
CPC ........ H04W 4/02; H04W 88/02; H04W 88/06; H04W 4/001; H04W 8/22
USPC ........ 455/420, 456.3, 50, 432.2, 414.1, 418, 455/552.1, 455, 9, 558, 411; 370/252, 370/328, 336
See application file for complete search history.

(56) References Cited

U.S. PATENT DOCUMENTS

| | | | |
|---|---|---|---|
| 6,615,218 B2 | 9/2003 | Mandal et al. |
| 6,684,241 B1 | 1/2004 | Sandick et al. |
| 7,552,238 B2 | 6/2009 | Gulland |
| 7,554,959 B1 | 6/2009 | Dowling |
| 7,693,976 B2 | 4/2010 | Perry et al. |
| 7,697,472 B2 | 4/2010 | Sadovsky et al. |

(Continued)

FOREIGN PATENT DOCUMENTS

WO    2014023872 A1    2/2014

OTHER PUBLICATIONS

Jammes, et al., "Service-Oriented Device Communications Using the Devices Profile for Web Services," Proceedings of the 3rd international workshop on Middleware for Pervasive and Ad-Hoc Computing, 2005, ACM, France, 8 Pages. http://john.terminal.se/john/examensarbete%202007/Service-Oriented%20Device%20Communications.pdf.

(Continued)

*Primary Examiner* — Inder Mehra
(74) *Attorney, Agent, or Firm* — Amin, Turocy & Watson, LLP

(57) ABSTRACT

Wireless communication network access is facilitated via multiple logic-capable storage (MLCS) devices. One method comprises: scanning a record of records stored in a MLCS device to determine whether a communication device associated with a request for communication establishment has a defined functionality; and generating information indicative of the communication device failing to have the defined functionality based on identifying a value range inclusive of an identifier of the communication device and based on determining that the MLCS device is a negative logic storage device, wherein the MLCS device is programmable to have a first type of logic at a first time and a second type of logic at a second time. The first type of logic can be (Continued)

the negative logic type and the second type of logic can be a positive logic type.

20 Claims, 12 Drawing Sheets

(56) References Cited

U.S. PATENT DOCUMENTS

| | | | |
|---|---|---|---|
| 7,831,734 | B2 | 11/2010 | Bernhard et al. |
| 7,966,391 | B2 | 6/2011 | Anderson et al. |
| 8,041,786 | B2 | 10/2011 | Tindal et al. |
| 8,082,335 | B2 | 12/2011 | Mishra et al. |
| 8,108,495 | B1 | 1/2012 | Zuk et al. |
| 8,131,799 | B2 | 3/2012 | Landsman et al. |
| 8,339,991 | B2 | 12/2012 | Biswas et al. |
| 8,432,832 | B2 | 4/2013 | Zuk et al. |
| 8,473,606 | B2 | 6/2013 | Kronenberg et al. |
| 8,682,375 | B2 | 3/2014 | Tu |
| 2003/0018755 | A1 | 1/2003 | Masterson et al. |
| 2003/0084135 | A1 | 5/2003 | Narain |
| 2003/0187963 | A1 | 10/2003 | Tsai et al. |
| 2006/0221893 | A1 | 10/2006 | Kiss |
| 2012/0184258 | A1 | 7/2012 | Kovvali et al. |
| 2012/0185576 | A1 | 7/2012 | Qu et al. |
| 2012/0282922 | A1 | 11/2012 | Fodor et al. |
| 2012/0315883 | A1* | 12/2012 | Shaw ............... H04W 8/18 455/414.1 |
| 2013/0031120 | A1 | 1/2013 | Passani et al. |
| 2014/0282020 | A1 | 9/2014 | Piper et al. |

OTHER PUBLICATIONS

Prasad, et al., "SyD: A Middleware Testbed for Collaborative Applications over Small Heterogeneous Devices and Data Stores," 2004, pp. 352-371, Springer Berlin Heidelberg, 20 Pages. http://www.cs.gsu.edu/~cscazz/postscript/middleware2004.pdf.

Suciu, et al., "Achieving "Always Best Connected" through Extensive Profile Management," Personal Wireless Communications, 2004, Springer Berlin Heidelberg, 10 Pages. http://opendl.ifip-tc6.org/db/conf/ifip6-8/pwc2004/SuciuBGS04.pdf.

De Rocha, et al., "Middleware: Context Management in Heterogeneous, Evolving Ubiquitous Environments," Apr. 2006, vol. 7, No. 4, IEEE Computer Society, 13 Pages. http://ieeexplore.ieee.org/stamp/stamp.jsp? tp=&arnumber=1631959.

Neumann, et al., "Architectural Concept of Virtual Automation Networks," 17th IFAC World Congress, Jul. 2008, pp. 13964-13969, IFAC, Seoul, Korea, 6 Pages. http://www.researchgate.net/profile/Peter_Neumann9/publication/228567071_Architectural_concept_of_virtual_automation_networks/links/00b49523caebcdca79000000.pdf.

* cited by examiner

| MULTI-DIMENSIONAL INFORMATION REPOSITORY DEVICE 412 | | | | | |
|---|---|---|---|---|---|
| COMMUNICATION DEVICE VALUE RANGE 500 | ENTRY 502 (AMR) | ENTRY 504 (AMR SINGLE MODE) | ENTRY 506 (AMR MULTI MODE) | ENTRY 508 (VOICE OVER IP) | ENTRY 510 (VOICE OVER LTE) | ENTRY 512 (NEW FUNCTIONALITY) |
| COMMUNICATION DEVICE VALUE RANGE 1 | 1 | 0 | 0 | 0 | 1 | PLACEHOLDER FOR NEW FUNCTIONALITY |
| COMMUNICATION DEVICE VALUE RANGE 2 | 1 | 1 | 1 | 0 | 1 | PLACEHOLDER FOR NEW FUNCTIONALITY |
| COMMUNICATION DEVICE VALUE RANGE 3 | 1 | 1 | 0 | 1 | 0 | PLACEHOLDER FOR NEW FUNCTIONALITY |

FIG. 5

COORDINATING WIRELESS COMMUNICATION NETWORK ACCESS VIA MULTIPLE LOGIC CAPABLE DATABASES

TECHNICAL FIELD

The subject disclosure relates generally to wireless communications, and to systems, apparatuses and methods of facilitating wireless communication network access via multiple logic-capable databases (hereinafter, "Multiple Logic-Capable Storage (MLCS) devices").

BACKGROUND

With an ever-increasing set of technologies being developed, new network functionalities are continually activated by cellular operators to improve performance and provide new services to communication devices. Because communication devices may be non-compliant with a particular standard, there may be an inability to determine the specific functionality of which a communication device is capable. Outages and poor service provisioning along with management inefficiencies can result.

BRIEF DESCRIPTION OF THE DRAWINGS

FIG. 5 illustrates an example block diagram of a multi-dimensional information repository device of the MLCS device of FIG. 1 in accordance with one or more embodiments described herein.

DETAILED DESCRIPTION

Figure 1:
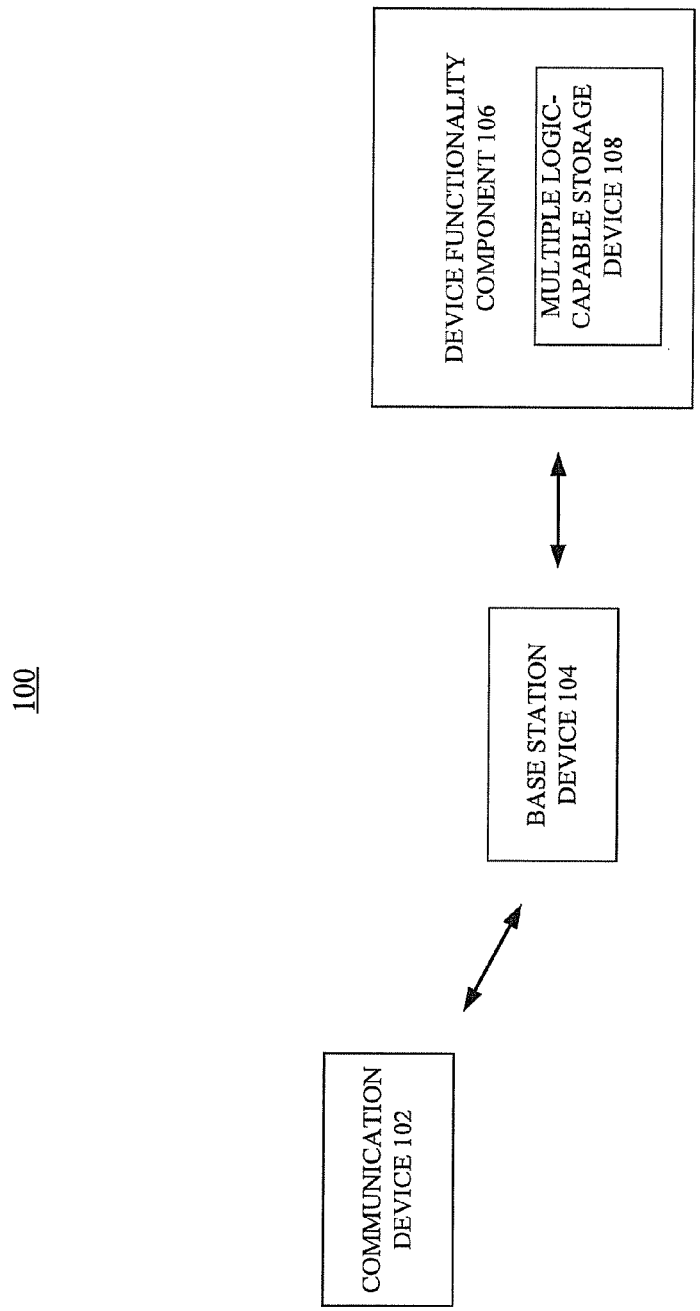
FIG. 1 illustrates an example schematic diagram of a system that facilitates wireless communication network access via a MLCS device in accordance with one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer," "consumer," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Long Range wireless technology (LoRA), Zigbee and other 802.XX wireless technologies and/or legacy telecommunication technologies. Further, the terms "femto" and "femto cell" are used interchangeably, and the terms "macro" and "macro cell" are used interchangeably.

Agility in deploying new services in a network is a key factor for a mobile operator to successfully operate in a very competitive market. With an ever-increasing set of technologies being developed, new network functionalities are continually activated by cellular operators to improve performance and provide new services to communication devices. Because communication devices may be non-compliant with a particular standard (e.g., Internet of Things (IoT) devices), there may be an inability to determine the specific functionality of which a communication device is capable. Outages and poor service provisioning along with management inefficiencies can result. One or more embodiments described herein can reduce the likelihood of service outages, reduce the complexity and inefficiencies of network management and/or reduce operational costs for provisioning services over wireless communication networks since the number of devices for which information is typically accessed can be on the order of hundreds of millions and/or since multi-standard environments exist.

Various embodiments can comprise systems, apparatus, methods and/or computer-readable storage media that facilitate wireless communication network access via a MLCS device. Embodiments described herein comprise MLCS devices programmable to interpret the contents stored in the MLCS devices according to different types of logic. If the MLCS device is programmed to operate according to positive logic, the presence of a value within a range of values associated with a particular communication device is interpreted to indicate the communication device has a particular type of functionality. By contrast, if the MLCS device is programmed to operate according to negative logic, the presence of a value within a range of values associated with a particular communication device is interpreted to indicate the communication device does not have a particular type of functionality. Accordingly, the MLCS device is capable of operating according to a first type of logic, a second type of logic or various combinations of logic. For example, with regard to a first functionality, the MLCS device can operate according to a first type of logic and with regard to a second functionality, the MLCS device can operate according to a second type of logic. Any number of combinations is possible. Any number of different types of functionality can be provisioned and the specific functionalities provisioned can change from time to time. The channel for a communication device is then provisioned based on the interpretation of the MLCS device.

In some embodiments, the MLCS device can be designed with specific logic and functionality combinations such that information for the fewest number of communication devices will be stored in the MLCS device, thus reducing the operational complexity and maintenance cost of the MLCS device. For example, for a low level of functionality (e.g., adaptive multi-rate (AMR) 12.2) that most communication devices are likely to have, the MLCs device can be programmed to operate according to negative logic so as to reduce the amount of information by storing information for communication devices that do not comprise the functionality (as opposed to storing information for all communication devices that do have the ability to operate according to the low level of functionality). By contrast, for a cutting-edge technology for which most communication devices are not likely to have capability (e.g., AMR multi mode (MM)), the MLCS device can be programmed to operate according to positive logic so as to reduce the amount of information by storing information for communication devices that do comprise the functionality (as opposed to storing information for all communication devices that do not have the ability to operate according to the high level of functionality).

In one embodiment, a computer-readable storage device is provided. The computer-readable storage device stores computer-executable instructions that, in response to execution, cause a system comprising a processor to perform operations. The operations comprise scanning a record of records stored in a multiple logic-capable storage device to determine whether a communication device associated with a request for communication establishment has a defined functionality. The operations also comprise generating functionality information indicative of the communication device failing to have the defined functionality based on identifying a value range inclusive of an identifier of the communication device and based on determining whether the multiple logic-capable storage device is a negative logic storage device, wherein the multiple logic-capable storage device is programmable to have a first type of logic at a first time and a second type of logic at a second time.

In another embodiment, a method is provided. The method can comprise: determining, by a device comprising a processor, whether a communication device is associated with a home network of the device; and responsive to a first determination that the communication device fails to be associated with the home network, assigning, by the device, the communication device to a first functionality. The method can also comprise, responsive to a second determination that an identifier for the communication device is associated with a range of values stored in a multiple logic-capable storage device, and based on determining whether the multiple logic-capable storage device has associated positive logic, assigning, by the device, the communication device to a second functionality. The method can also comprise, responsive to a third determination that the identifier for the communication device is associated with the range of values stored in the multiple logic-capable storage device, and based on determining whether the multiple logic-capable storage device has associated negative logic, assigning, by the device, the communication device to the first functionality.

In another embodiment, a system comprises: a processor; and a memory that stores executable instructions that, when executed by the processor, facilitate performance of operations. The operations can comprise identifying a defined functionality of a communication device of communication devices. The operations can also comprise determining to store information about the communication device in a first storage location or a second storage location of a multi-dimensional data storage system based on whether the defined functionality satisfies a defined condition, wherein the determining comprises determining to store the information in the first storage location based on the defined functionality satisfying the defined condition, and based on determining whether the first storage location has associated positive logic, and wherein the determining comprises determining to store the information in the second storage location based on the defined functionality satisfying the defined condition, and based on determining whether the second storage location has associated negative logic.

One or more embodiments can ease the introduction of new functionalities in an environment that comprises a variable mix of devices having different levels or types of capabilities. The flexibility offered by one or more embodiments can also facilitate deployment of multiple AMR functionalities with limited impact and costs to operation and maintenance organizations. Different embodiments described herein can apply to different utilized network architectures, spectrum blocks and/or wireless protocols. Further, one or more embodiments can facilitate a communication device roaming across numerous different network architectures, different interfaces or to proliferate (e.g., static Internet of Things devices) within such interfaces, without need for the communication device to signal to the network the capability/functionality that the communication device supports. The communication device can also participate in the decision of which network resource is assigned in some embodiments.

Turning now to the drawings, FIG. 1 illustrates an example schematic diagram of a system that facilitates wireless communication network access via a MLCS device in accordance with one or more embodiments described herein. In the embodiment shown, system 100 can comprise a DF component 106, which can comprise a MLCS device 108 programmable to operate according to a number of different types of logic (or different combinations of types of logic). In some embodiments, system 100 can also comprise a communication device 102 and a BS device 104. In various embodiments, one or more of the communication device 102, BS device 104, DF component 106 and/or MLCS device 108 can be electrically and/or communicatively coupled to one another to perform one or more functions of the system 100. As shown, bi-directional communication can be provided between the communication device 102 and the BS device 104 as well as between the BS device 104 and the DF component 106.

In particular, system 100 can facilitate efficient provisioning of services for roaming and/or home communication devices of a network notwithstanding the communication devices may be standard non-compliant. Further, in some embodiments, system 100 can facilitate service provisioning in a manner exacting minimal maintenance and operational costs on the MLCS device 108 and/or the DF component 106 or the like.

The communication device 102 can be any number of different types of devices configured to communicate from a number of different locations. By way of example, but not limitation, the communication device 102 can comprise any of a number of mobile or stationary devices such as mobile or cellular telephone, laptop, personal digital assistant (PDA), tablet computer, IoT devices (e.g., sensors) or the like. The communication device 102 can transmit information to and/or receive information from another device via the BS device 104 in some embodiments and over a channel (not shown) provisioned according to the functionality determined by the MLCS device 108. For example, in some embodiments, the communication device 102 can transmit information to the BS device 104 for establishment or continuation of a communication channel for communication with another device (e.g., terminating device).

Figure 2:
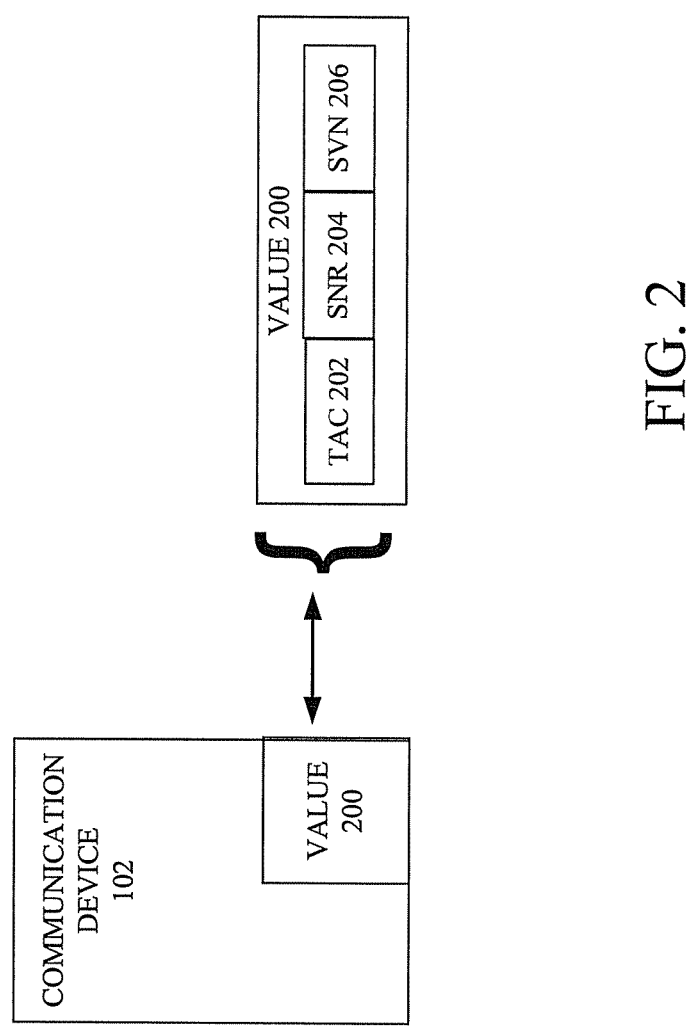
FIG. 2 illustrates an example block diagram of information stored in a communication device of the system of FIG. 1 in accordance with one or more embodiments described herein.

FIG. 2 illustrates an example block diagram of information stored in a communication device (e.g., communication device 102) of the system of FIG. 1 in accordance with one or more embodiments described herein. Repetitive description of like elements employed in other embodiments described herein is omitted for sake of brevity.

The information stored in the communication device 102 can be stored in the MLCS device 102 and scanned in various embodiments to determine whether a particular mobile device has a particular functionality. As shown, communication device 102 can have an associated value (e.g., International Mobile Station Equipment Identity (IMEI) and Software Version (IMEI SV) value, as defined in clause 6; 3GPP TS 23.003). In one embodiment, the IMEI value (or IMEI SV value) 200 for the communication device 102 is a 16 digit decimal number composed of three distinct elements: an 8 digit Type Allocation Code (TAC) 202; a 6 digit Serial Number (SNR) 204; and a 2 digit Software Version Number (SVN) 206. The IMEI SV value 200 can be formed by concatenating elements 202, 204, 206 as illustrated in FIG. 2.

The TAC values 202 can be utilized to identify a specific model of communication device 102. Accordingly, an IMEI value 200 and/or TAC value 202 stored in the MLCS can indicate a number of mobile devices having the model number specified by the TAC value 202 or the IMEI value 200 (which comprises the TAC value 202). In some embodiments, the IMEI value 200 and/or TAC value 202 can be entered manually into the MLCS device 108 based on information about different capabilities of models of communication devices. In some embodiments, the IMEI values 200 and/or TAC values 202 can be entered automatically upon receipt of information after certification or confirmation of the functionality of a particular type of communication device. Different models of communication devices can be tested and certified for particular functionality (e.g., for particular AMR 12.2, AMR single mode (SM) or AMR multi mode (MM) functionality). If a communication device supports a particular AMR, the communication device can be considered to be capable of such functionality.

In some embodiments in which the MLCS device 108 is a negative logic storage device, if the particular mobile device has a particular functionality of interest (e.g., AMR 12.2 functionality or any of a number of other types of functionalities), the mobile device is considered capable of such functionality if the range of values (e.g., range of IMEI values 200 or TAC values 202) that comprises the model number for that communication device is not stored in the MLCS device 108 (since the MLCS device 108 is a negative logic storage device). If the communication is not capable of such functionality, the IMEI value 200 and/or the TAC value 202 associated with the model of the communication device 102 can be inserted in the MLCS device 108 (since the MLCS device 108 is a negative logic storage device in this example). Upon storage in the negative logic MLCS device 108, communication devices with such IMEI values 200 or TAC values 202 will be considered incapable of such functionality. The communication device can be then assigned a lower or alternative functionality than that for which the communication device does not have capability.

Turning back to FIG. 1, as shown, the BS device 104 can be communicatively coupled between the communication device 102 and the DF component 106. In various embodiments, the BS device 104 can perform any number of operations for establishment of a channel over which the communication device 102 can communicate comprising, but not limited to, configuring a channel based on functionalities identified by the DF component 106 based on scanning the MLCS device 108 for information about the communication device 102.

The DF component 106 can comprise or be communicatively coupled to the MLCS device 108 and the BS device 104. In some embodiments, the DF component 106 can comprise the structure and/or functionality of a mobile switching center of a network. While the MLCS device 108 is shown within the DF component 106, in some embodiments, the MLCS device 108 is merely communicatively coupled to, and therefore accessible by, the DF component 106 and is located within the DF component.

The MLCS device 108 is a dynamic database that stores information about the functionality of one or more different communication devices (e.g., communication device 102). The information stored in the MLCS device 108 can be indicative of a range of one or more values that are associated with different models of communication devices. As such, one range of values specified in the MLCS device 108 can indicate or identify a plethora of mobile devices.

The MLCS device 108 is programmable to interpret results of scanned information stored in the MLCS device 108 according to one or more different types of logic. For example, the MLCS device 108 (or, in some embodiments, the DF component 106) can scan information stored in the MLCS device 108 according to a positive logic operation in which identification of the presence of a range of values that comprises a particular communication device indicates that the communication device has a particular functionality for which the MLCS device 108 (or, in some embodiments, the DF component 106) is scanning. As another example, the MLCS device 108 (or, in some embodiments, the DF component 106) can scan information stored in the MLCS device 108 according to a negative logic operation in which identification of the presence of a range of values that comprises a particular communication device indicates that the communication device fails to have a particular functionality for which the MLCS device 108 (or, in some embodiments, the DF component 106) is scanning.

The ability to interpret stored information according to multiple types of logic can facilitate gradual deployment of services or technologies across multiple phases or for selective deployment during a single phase. For example, with regard to gradual deployment across multiple phases, provisioning can be executed from a first phase in the market introducing very few communication devices that have a particular functionality to a second or third phase of market saturation and a corresponding high number of communication devices capable of a particular functionality or in which all devices in the market have the particular functionality.

The MLCS device 108 can be interrogated by the BS device 104 on behalf of the communication device 102 accessing the BS device 104. In some embodiments, the communication device 102 can transmit a request to establish or continue a communication via the BS device 104. The BS device 104 can transfer the initial information sent from the communication device (and/or any other information identifying the communication device 102) to the DF component 106 requesting a channel for communication with another communication device (not shown).

The DF component 106 (or, in some embodiments, the MLCS device 108) can receive this request and scan or search the contents of the MLCS device 108 (or otherwise reference information about the contents of the MLCS device 108) to determine whether there is a value or range of values stored in the MLCS device 108 that comprises or identifies the communication device 102 transmitting the request. Based on the result of scanning the MLCS device 108 for that value or range of values, the DF component 106 responds back to the BS device 104 with information indicative of whether the communication device 102 has the functionality for which the DF component 106 (or the MLCS device 108) was scanning.

The determination can be made based on the type of logic of the MLCS device 108, which can change or be changed from time to time. For example, if the MLCS device 108 is a positive logic storage device, identification of the communication device 102 in a value or range of values stored in the MLCS device 108 indicates the communication device 102 is configured with the functionality. If the MLCS device 108 is a negative logic storage device, identification of the communication device 102 in a value or range of values stored in the MLCS device 108 indicates the communication device 102 is not configured with the functionality.

By way of example, but not limitation, if a value (e.g., IMEI value 200) for the communication device 102 is found in the range of values stored in the MLCS device 108, and the MLCS device 108 is a negative logic storage device, the DF component 106 (or, in some cases, the MLCS device 108) responds to the BS device 104 with a defined value (e.g., 0 bit) to indicate that the communication device 102 does not have the functionality requested. The response can be provided via a RAB assignment request indicating a type of functionality that can be assigned to the communication device 102.

If the MLCS device 108 has positive logic functionality, and the DF component 108 finds the value (e.g., IMEI) of the communication device 102, then the communication device 102 has the functionality and the DF component 106 responds to the BS device 104 with a different defined value (e.g., 1 bit) to indicate that the communication device 102 has the functionality requested. While a 0 bit and a 1 bit are used in the examples shown, in other embodiments, any number of other type of information can be transmitted from the DF component 106 (or from the MLCS device 108) to the BS device 104 to indicate whether the communication device 102 has a defined functionality for which MLCS device 108 was searched, scanned or otherwise evaluated.

The BS device 104 can configure a channel for the communication device 102 aligned with the type of functionality of which the communication device 102 is capable. For example, the configuration can be for any of a number of functionalities that are capable by the communication device. For example, if a communication device 102 having AMR MM capability is shown, the DF component 106 or the MLCS device 108 can generate information for the BS device 104 that allows the BS device 104 to configure a channel for AMR MM functionality or for a lesser functionality (e.g., AMR 12.2 functionality). In this case, the BS device 104 and/or the communication device 102 can select one of the offered levels of functionality for the channel. In some embodiments, the BS device 104 can configure the channel with the level of functionality providing the greatest efficiency, service, meeting a previously-agreed upon quality of service or the like.

In various embodiments described herein, the approach to configuring channels with particular functionalities, whether the communication device 102 is operating in a standard compliant or a standard non-compliant manner, can improve the likelihood of smooth implementation/roll-out of technologies and/or avoid a disruptive effect on pre-existing status quo functionalities. A typical example of functionality not supported by older version communication devices is the AMR SM 5.9 codec. In this case, upon searching the MLCS device 108 for a value or range of values associated with an older device, the communication device 102 would be assigned a functionality having a lower rate (e.g., AMR 12.2).

In embodiments in which a communication device 102 is determined to be a roaming device, the BS device 104 can assign the communication device 102 a low level of functionality for the network. The DF component 106 can forego scanning the MLCS device 108 since information identifying the roaming device is not likely to be stored in the MLCS device 108 since the information stored in the MLCS device 108 can be limited, in some embodiments, to the communication devices associated with users that have contracts with the home network (e.g. AT&T customers having service contracts for service via the AT&T network).

Accordingly, the DF component 106 can generate information for receipt by the BS device 104 that can indicate whether the communication device 102 can be assigned a specific functionality. Based on the functionality that the communication device 102 is determined to have as reported by the DF component 106, the BS device 104 prepares the configuration of the channel that the communication device 102 is to communicate. The channel is established accordingly (e.g., service degradation or upgrade to a defined functionality of which the communication device is capable).

Figure 3:
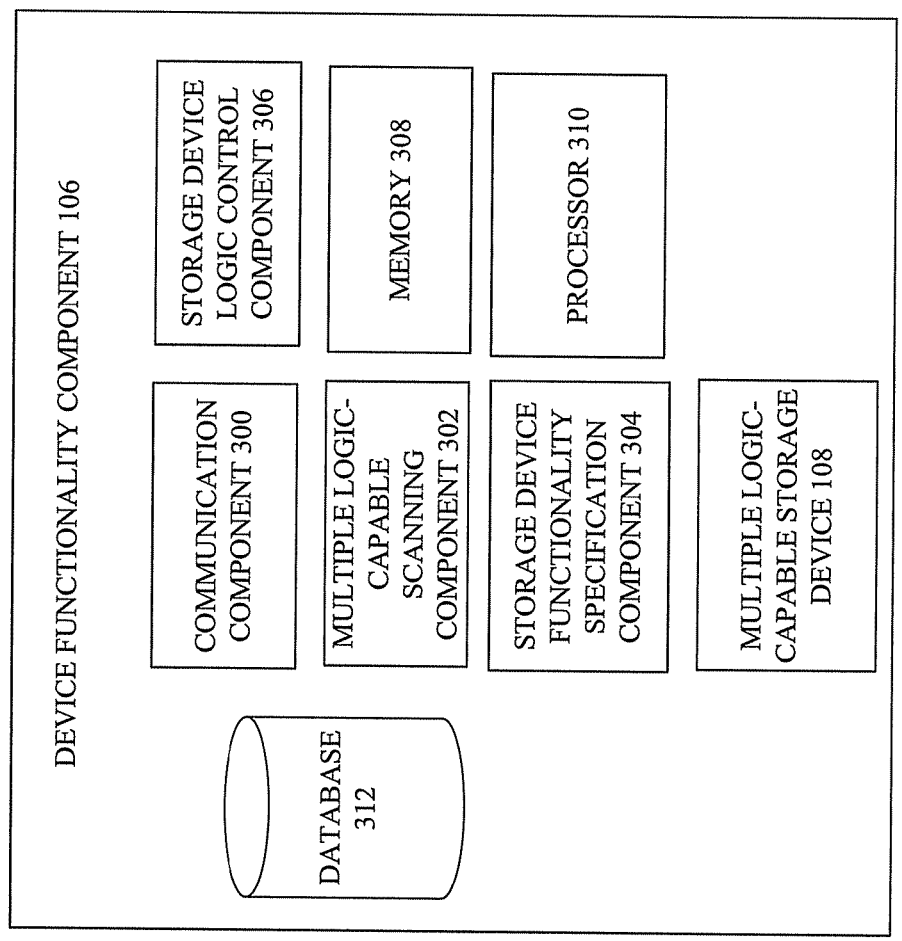
FIG. 3 illustrates an example block diagram of a device functionality (DF) component of the system of FIG. 1 in accordance with one or more embodiments described herein.

FIG. 3 illustrates an example block diagram of a DF component of the system of FIG. 1 in accordance with one or more embodiments described herein. Repetitive description of like elements employed in other embodiments described herein is omitted for sake of brevity. The DF component can comprise a communication component 300, a multiple logic-capable scanning component 302, a storage device functionality specification component 304, a MLCS device 108, a storage device logic control component 306, a memory 308, a processor 310 and/or a database 312. In various embodiments, one or more of the communication component 300, multiple logic-capable scanning component 302, storage device functionality specification component 304, MLCS device 108, storage device logic control component 306, memory 308, processor 310 and/or database 312 can be electrically and/or communicatively coupled to one another to perform one or more functions of the DF component 106.

With reference to FIGS. 1 and 3, the communication component 300 can receive from the BS device 104 a request for channel establishment for a communication device. The communication component 300 can transmit information to the BS device 104 indicative of the type of functionality of which the communication device 102 is capable. In some embodiments, the communication component 300 can output information indicative of an interpretation of results of scanning based on the type of logic of the MLCS device 108.

The multiple logic-capable scanning component 302 can scan or search the MLCS device 108 to determine whether a value or range of values associated with or identifying the communication device 102 is stored in the MLCS device 108. The storage device functionality specification component can select and populate the entries of the MLCS device 108 for specific functionalities for inclusion in the MLCS device 108 and/or change the functionalities from time to time. The storage device logic control component 306 can determine whether the contents of the MLCS device 108 will be interpreted according to negative logic, positive logic or a combination of negative and positive logic for different functionalities.

The processor 310 can perform one or more of the functions described herein with reference to the DF component 106. The memory 310 can be a computer-readable storage medium storing computer-executable instructions and/or information configured to perform one or more of the functions described herein with reference to the DF component 106. For example, the memory 310 can store computer-executable instructions for scanning information stored in the MLCS device 108, interpretation based on the logic of the MLCS device 108 and the like. The database 312 can be configured to store information transmitted to, received by and/or processed by the DF component 106 comprising, but not limited to, the value associated with a TAC or IMEI of a communication device 102.

Figure 4:
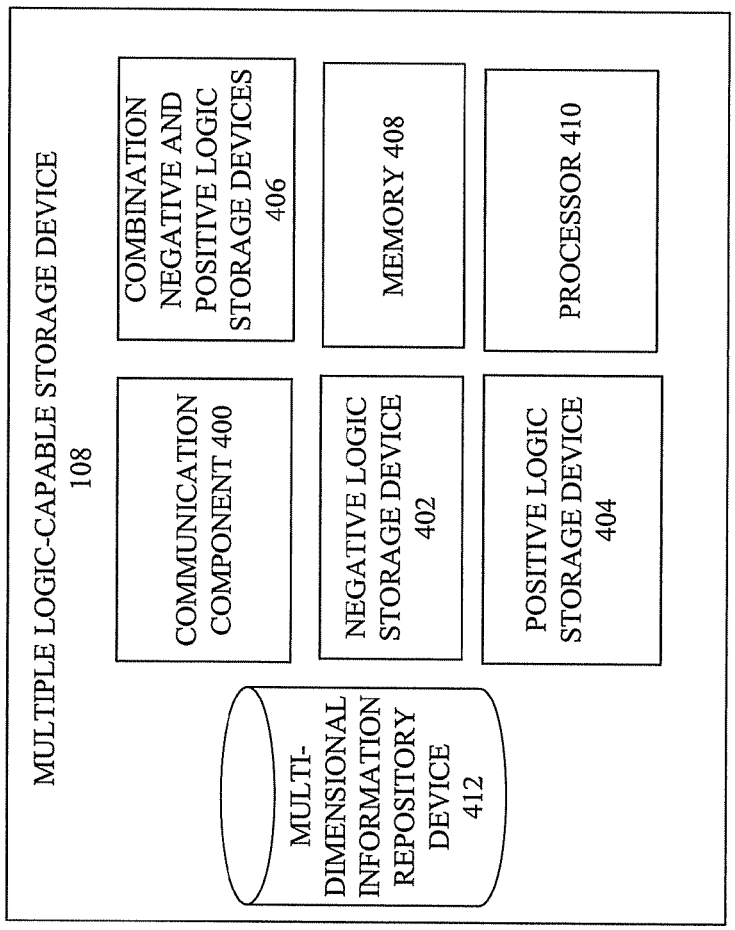
FIG. 4 illustrates an example block diagram of a MLCS device of the DF component of the system of FIG. 1 in accordance with one or more embodiments described herein.

FIG. 4 illustrates an example block diagram of a MLCS device (e.g., MLCS device 108) of the DF component of the system of FIG. 1 in accordance with one or more embodiments described herein. Repetitive description of like elements employed in other embodiments described herein is omitted for sake of brevity.

The MLCS device 108 can comprise a communication component 400, negative logic storage device 402, positive logic storage device 404, combination negative and positive logic storage devices 406, memory 408, processor 410 and/or multi-dimensional information repository device 412. In various embodiments, one or more of the communication component 400, negative logic storage device 402, positive logic storage device 404, combination negative and positive logic storage devices 406, memory 408, processor 410 and/or multi-dimensional information repository device 412 can be electrically and/or communicatively coupled to one another to perform one or more functions of the MLCS device 108.

The communication component 400 can be configured to receive information to facilitate scanning or searching the MLCS device 108 for a particular IMEI or TAC of the communication device 102. The communication component 400 can also output information indicative of whether a value or range of values is identified that corresponds to the communication device 102. In some embodiments, the communication component 400 can output information indicative of an interpretation of results of scanning based on the type of logic of the MLCS device 108.

The negative logic storage device 402 can store one or more values or ranges of values for one or more defined functionalities (as shown and described with reference to negative logic storage device 402 of FIG. 7). If a communication device is identified in the value or range of values within the negative logic storage device 402, the communication device fails to have the defined functionality associated with the negative logic storage device 402.

The positive logic storage device 404 can store one or more values or ranges of values for one or more defined functionalities (as shown and described with reference to positive logic storage device 404 of FIG. 8). If a communication device is identified in the value or range of values within the positive logic storage device 404, the communication device has the defined functionality associated with the positive logic storage device 404.

The combination negative and positive logic storage devices 406 can store one or more values or ranges of values for two or more defined functionalities (as shown and described with reference to negative logic storage device 402 and positive logic storage device 404 of FIG. 8). A multi-dimensional method such as that described with reference to FIG. 8 can be employed to determine the functionality for a particular communication device based on storage location and logic of the particular storage location.

The processor 410 can perform one or more of the functions described herein with reference to the MLCS device 108. The memory 408 can be a computer-readable storage medium storing computer-executable instructions and/or information configured to perform one or more of the functions described herein with reference to the MLCS device 108. For example, the memory 408 can store computer-executable instructions for storage of information in a multi-dimensional database.

The multi-dimensional information repository device 412 can be configured to store information transmitted to, received by and/or processed by the MLCS device 108. A multi-dimensional information repository device 412 can be described in greater detail with reference to FIG. 5.

Shown in FIG. 5 is an illustration of an example block diagram of a multi-dimensional information repository device of the MLCS device of FIG. 1 in accordance with one or more embodiments described herein. Repetitive description of like elements employed in other embodiments described herein is omitted for sake of brevity.

As shown, in the multi-dimensional information repository device 412, numerous data entry storage locations can be provided for IMEI or TAC values or ranges of values. The communication device ranges are shown designated as Communication Device Value Range 1, Communication Device Value Range 2 and Communication Device Value Range 3. However, in various embodiments, the actual numerical values (or other indicators) of the ranges can be stored in the multi-dimensional information repository device 412. The various ranges can be associated with one or more communication devices. For example, Communication Device Value Range 1 can specify a range of values that indicates one or more model numbers associated with numerous different communication devices.

The multi-dimensional information repository device 412 can also comprise any number of entry locations that can be associated with any number of different functionalities that a communication device can have. For example, in some embodiments, entry 502 can be an entry that can be populated to indicate whether a communication device in Communication Device Value Range 1, 2 or 3 has AMR 12.2 functionality, entry 504 can be an entry that can be populated to indicate whether a communication device in Communication Device Value Range 1, 2 or 3 has AMR SM functionality and entry 506 can be an entry that can be populated to indicate whether a communication device in Communication Device Value Range 1, 2 or 3 has AMR MM functionality. Entry 508 can be an entry that can be populated to indicate whether a communication device in Communication Device Value Range 1, 2 or 3 has voice over IP functionality, entry 510 can be an entry that can be populated to indicate whether a communication device in Communication Device Value Range 1, 2 or 3 has voice over LTE functionality. In various embodiments, entry 512 can comprise any other type of functionality. In some embodiments, while the different functionalities are included, in other embodiments, any number of functionalities can be included in the multi-dimensional information repository device 412. Accordingly, as technology changes, new functionalities can be added to the repository storage device and/or can replace older technologies/functionalities. For example, if the multi-dimensional information repository device 412 is associated with a positive logic MLCS device 108, with reference to FIG. 5, communication devices that are identified by Communication Device Value Range 1 are capable of AMR 12.2 and Voice over LTE, while communication devices that are identified by Communication Device Value Range 2 are capable of AMR 12.2, AMR SM, AMR MM and Voice over LTE, and communication devices that are identified by the Communication Device Value Range 3 are capable of AMR 12.2, AMR SM and Voice over IP.

In some embodiments, a multi-dimensional code can be assigned using different columns of the multi-dimensional information repository device 412. Multi-dimensional code can be embedded in the scanning algorithm, for example. By populating multiple columns in the multi-dimensional information repository device 412, it is possible to know the compatibility of each device with multiple network functionalities and/or characteristics (where not communicated through standard signaling) one per each column. In addition, each column can be populated using multiple logic (variable logic within the same column) to reduce the number of operator interventions for database maintenance and update. The multi-dimensional code can rely on and/or employ an algorithm to identify characteristics such as: functionality, logic used, groups and sub-groups, device brand and manufacturer, and generate or output the best possible function to assign to the device.

While not shown, in some embodiments, information indicative of network node characteristics can also be stored in the MLCS device 108 (e.g. in the form of counters and/or key performance indicators), dynamically updated and available to be scanned and/or searched. For example, network access can be assisted by historical pattern awareness. With regard to the use of network node characteristics and historical pattern awareness, as of today, mobile devices and network nodes are not gaining/granting access based on historical data and projections of traffic dynamics. One or more embodiments described herein can complement the resource utilization monitoring status quo with the forecasted traffic patterns. This information can be used as an additional metric for a decision to grant access to a device. Historical data and expected patterns can be stored in dynamically accessible databases and can be used to determine best service to be granted. One example is the spectrum sharing access type in which a device should know how long a specific spectrum block is going to be used in the future and/or how long the device will be able to use the specific spectrum block.

Figure 6:
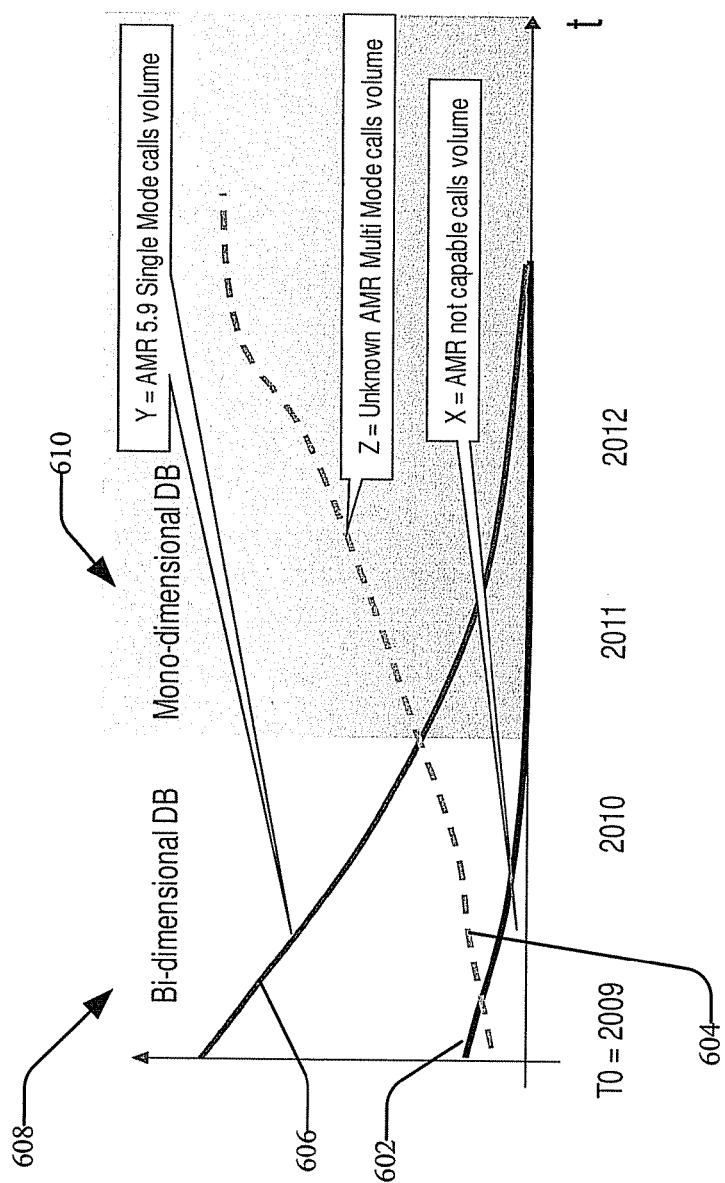
FIG. 6 illustrates an example graph of numbers of communication devices with defined functionality versus time for the design of the system of FIG. 1 in accordance with one or more embodiments described herein.

FIG. 6 illustrates an example graph of numbers of communication devices with defined functionality versus time for the design of the system of FIG. 1 in accordance with one or more embodiments described herein. Repetitive description of like elements employed in other embodiments described herein is omitted for sake of brevity.

The graph shows a distribution of types of AMR calls expected to be requested by communication devices associated with a particular home network. The request would be received at the BS device 104 and the DF component 106. As described, the MLCS device 108 would be searched and/or scanned to determine whether the communication devices have the different functionalities.

As shown in FIG. 6, the distribution of the functionality of communication devices along with functionalities availability and deployment phases vary with time. The communication devices that do not have AMR (e.g., AMR 12.2) functionality are shown at the curve indicated by reference numeral 602; the communication devices that have AMR SM functionality are shown at the curve indicated by reference numeral 604; and the communication devices that have AMR MM functionality are shown at the curve indicated by reference numeral 606.

As shown, the number of communication devices having AMR MM functionality at launch date T0 is considered unknown and potentially low. In the same time frame (e.g., approximately t=T0), greater than 70 percent of the communication devices associated with a defined particular home network will have AMR SM functionality and be already active (and can therefore be assigned AMR 5.9 functionality). In one or more embodiments, the single mode benefits can be preserved while launching AMR MM (shown in the first region 608, which is associated with bi-dimensional database functionality). In some embodiments, the MLCS device 108 can be designed at one point in time bi-dimensional database distinguishing between three cases: whether devices are AMR not capable, AMR SM capable or AMR MM capable. This configuration of the MLCS device 108 can be employed until the AMR MM calls volume is high enough to justify a mono-dimensional database operation (shown in region 610) distinguishing between only two cases: AMR MM capable and AMR MM not capable devices. The communication devices having AMR SM functionality can at that time be indicated as not AMR MM capable and assigned AMR 12.2. Accordingly, the MLCS device 108 can be dynamically controlled based on selected criteria for interpreting MLCS device 108 scanning results. The manner of controlling the interpretation of the MLCS device 108 can be based on minimizing entries that will be scanned in the MLCs device 108 for a particular type of functionality (and therefore to follow network changes and minimize operational complexities and costs).

Figure 7:
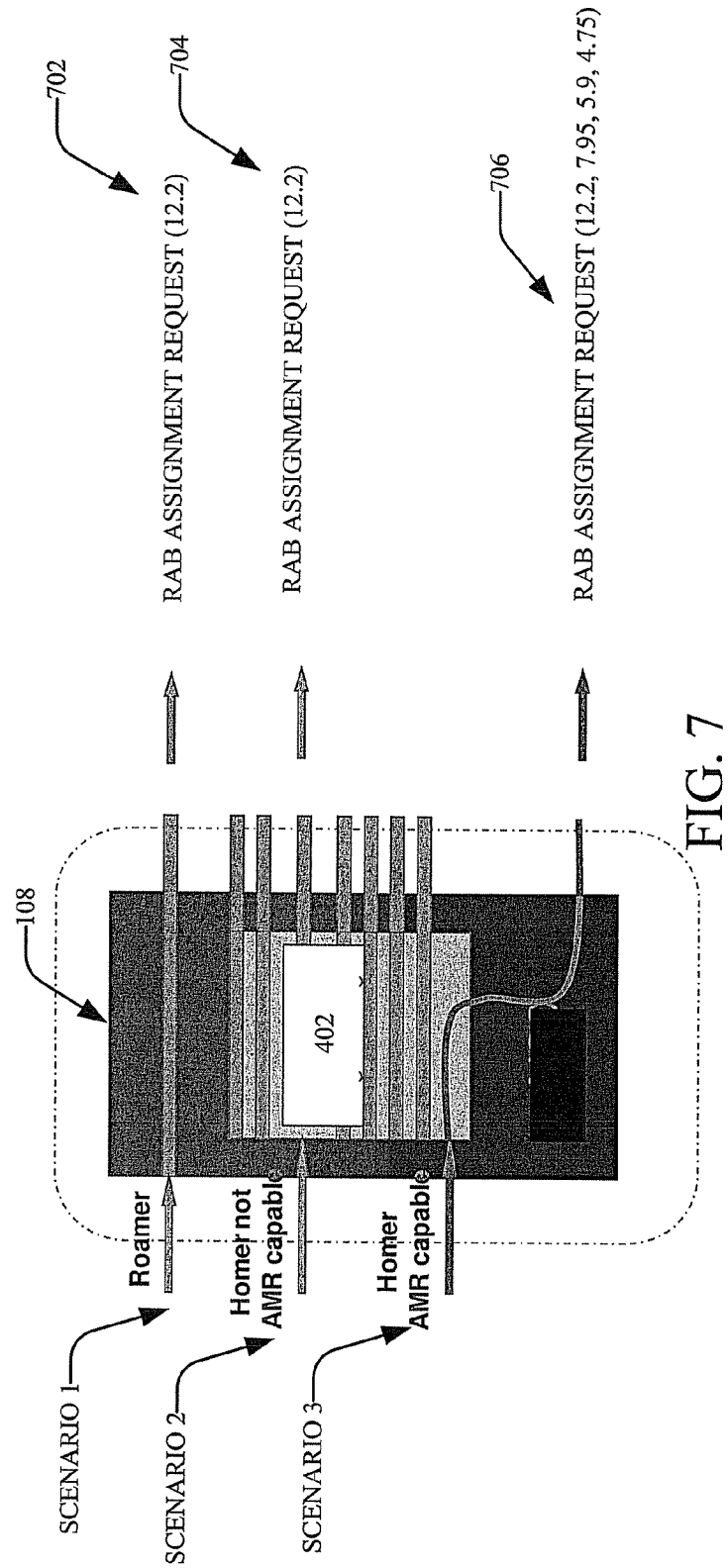
FIG. 7 illustrates an example flow diagram facilitating wireless communication network access employing a negative logic storage device of a MLCS device in accordance with one or more embodiments described herein.

FIG. 7 illustrates an example flow diagram facilitating wireless communication network access employing a negative logic storage device of a MLCs device in accordance with one or more embodiments described herein. Repetitive description of like elements employed in other embodiments described herein is omitted for sake of brevity.

The negative logic storage device 402 of the MLCs device 108 is designed such that if a particular value or range of values (e.g., range of IMEI or TAC values) is included in the negative logic storage device 402, the communication device associated with the range of values or value does not have the specified functionality associated with the negative logic storage device 402. The specified functionality and/or type of logic can change from time to time.

In the embodiment shown, a single dimensional negative logic storage device 402 can be scanned (e.g., by DF component 106 or MLCS 108 of FIG. 1) to determine whether a communication device has an IMEI or TAC that is identified by a value or range of values stored in the negative logic storage device 402. For example, in the embodiment shown, the negative logic storage device 402 can store the TAC/IMEI ranges of the communication devices that do not have AMR MM functionality.

As shown in Scenario 1, the communication device is a roaming device not part of the home network of the DF component 106 (or the MLCS device 108), the DF component 106 (or the MLCS device 108) can forego checking the negative logic storage device 402 and instead assign a low level (or a defined level) of functionality for the roaming device by default (since it is unlikely information for the roaming device will be stored in the MLCS device 108 and/or the roaming device functionality may be unable to be certified or ascertained by the home network since the roaming device is not associated with the home network). For example, as between AMR MM, AMR SM and AMR 12.2, AMR 12.2 can be assigned to the roaming device by default.

As shown in Scenario 2, if the communication device is associated with the home network of the DF component 106 (or the home network of the MLCS device 108), and the IMEI value or TAC value for the communication device is identified based on the value or the range of values stored in the negative logic storage device 402 of the MLCS device 108, the communication device can be assigned a low level of functionality since the presence of the identifier for the communication device in the negative logic storage device 402 indicates that the communication device does not have the functionality of a higher (or alternative) level and the communication device should be considered to have AMR 12.2 functionality and the BS device 104 can then assign the communication device an AMR 12.2 channel for communication.

As shown in Scenario 3, if the IMEI or TAC for the communication device is not present or identified by any of the values or ranges in the negative logic storage device 402, the DF component 106 (or, in some embodiments, the MLCS device 108) assigns multiple options of functionality to the communication device. For example, in this case, the DF component 106 (or MLCS device 108) can generate information indicating a number of different levels of functionality possible for the communication device. For example, the information can be in the form of a RAB assignment request 706, which can comprise a RAB assignment request providing that the BS device 104 can assign the communication device (e.g., communication device 102) AMR 12.2, 7.95, 5.9, 4.75).

Figure 8:
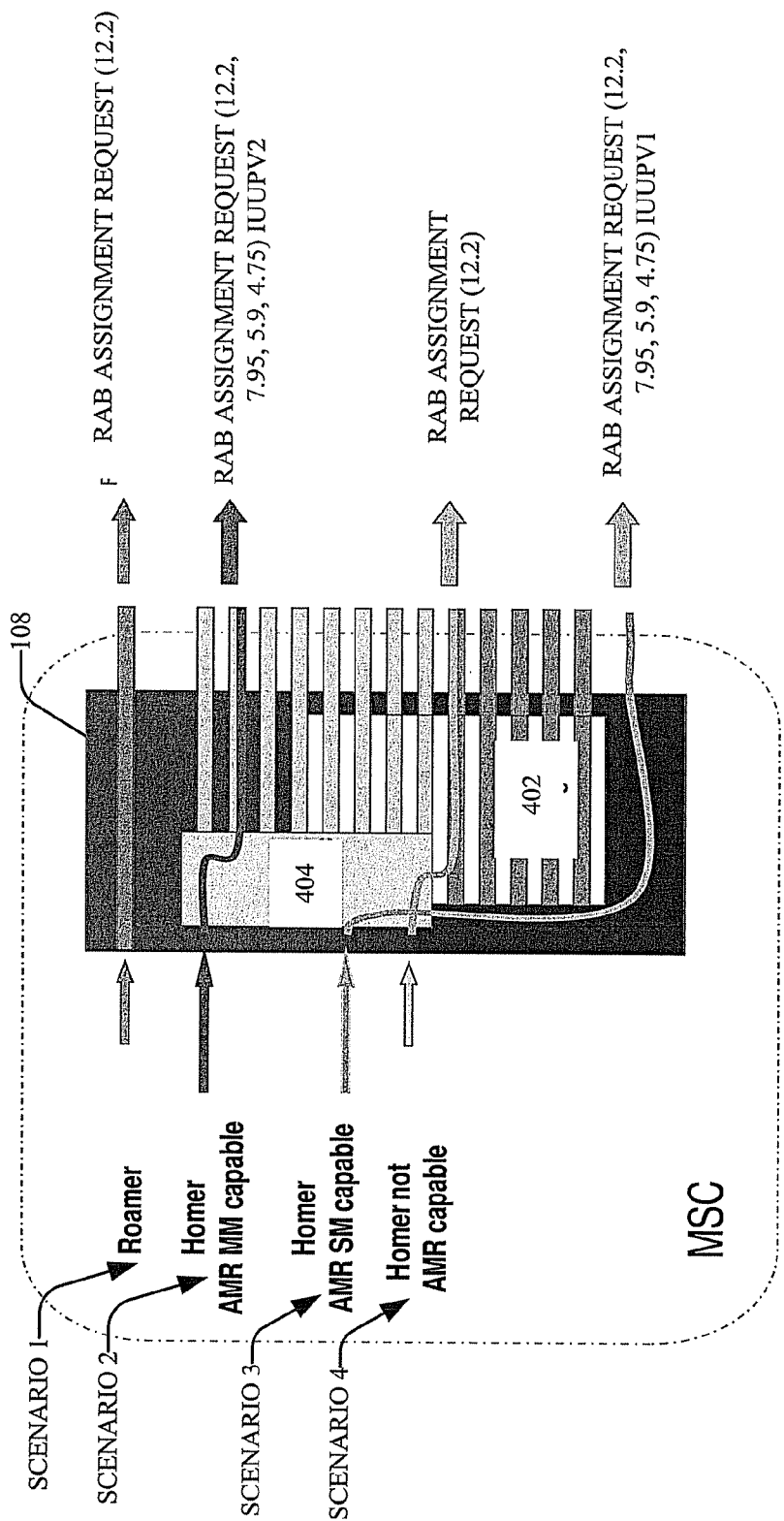
FIG. 8 illustrates an example flow diagram facilitating wireless communication network access employing negative logic and positive logic storage devices of a MLCS device in accordance with one or more embodiments described herein.

FIG. 8 illustrates an example flow diagram facilitating wireless communication network access employing negative logic and positive logic storage devices of a MLCs device in accordance with one or more embodiments described herein. Repetitive description of like elements employed in other embodiments described herein is omitted for sake of brevity.

The combination storage system 108 can comprise two storage devices: negative logic storage device 402 and positive logic storage device 404. In the design shown, the negative logic storage device 402 can be employed for lower level and/or older functionality and the positive logic positive logic storage device 404 can be employed for higher level and/or newer functionality.

As shown, in some embodiments, the MLCS device 106 can comprise both positive logic and negative logic storage devices, and/or operate/interpret scanning results according to two different types of logic for two or more different types of designated functionalities. FIG. 8 is an example.

In FIG. 8, if a TAC or IMEI for a communication device is identified or present based on a value or range of values in the positive logic storage device 404, a communication device is determined to have the specified functionality associated with the positive logic storage device 404. If a TAC or IMEI for a communication device is identified or present based on a value or range of values in the negative logic storage device 402, a communication device is determined to not have the specified functionality associated with the negative logic storage device 402. The specified functionality can change from time to time.

The positive logic storage device 404 can be designed for storage of values or ranges of values for communication devices having a particular functionality. For example, the functionality can be that for which the numbers of communication devices having the functionality is limited or less than a defined threshold. For example, in one embodiment, positive logic storage device 404 can be designed to be store only information for communication devices when the number of certified AMR MM capable communication devices is limited. The maintenance of and/or updates to the positive logic storage device 404 is therefore limited due to the limited/reduced number of entries of ranges representing communication devices.

When the number of AMR MM entries will start increasing (as time progresses and more devices become AMR MM capable), the positive logic storage device 404 can be de-activated and the logic for the entirety of the MLCS device 108 can become a single dimensional AMR MM capable/non-capable storage device storing a first value to indicate that a communication device does not have the AMR MM functionality and indicating a second value to indicate that a communication device has the AMR MM functionality. In this mono-dimensional embodiment, information for the communication devices that are not AMR MM capable can be stored in a negative logic storage device 402 (which is designed according to negative logic) and assigned a low level functionality (e.g., AMR 12.2).

An example of functionality can be as shown in FIG. 8 in which the positive logic storage device 404 is associated with AMR MM functionality and the negative logic storage device 402 is associated with AMR SM functionality and AMR 12.2 functionality. As shown in Scenario 1, if a device is a roaming device, the storage devices 402, 404 need not be scanned and the roaming device can be assigned a low level or older level functionality by default (e.g., AMR 12.2).

In Scenario 2, if a device is associated with the home network, the positive logic storage device 402 can be first scanned. As shown, the identifier for the communication device is located and information can be output to the BS device 104 indicating that any of the AMR MM, AMR SM or AMR 12.2 functionalities can be configured by the BS device 104 for the communication device channel.

In Scenario 3, if a device is associated with the home network, the positive logic storage device 402 can be first scanned. As shown, in this case, the communication device identifier is not located in the positive logic storage device 404 and the negative logic storage device 402 is therefore scanned. In this design, the negative logic storage device 402 is associated with the AMR SM and the AMR 12.2 functionalities. The identifier for the communication device is not located in the negative logic storage device 412 and information can be output to the BS device 104 indicating that any of the AMR SM or AMR 12.2 functionalities can be configured by the BS device 104 for the communication device channel.

In Scenario 4, if a device is associated with the home network, the positive logic storage device 402 can be first scanned. As shown, in this case, the communication device identifier is not located in the positive logic storage device 404 and the negative logic storage device 402 is therefore scanned. In this design, the negative logic storage device 402 is associated with the AMR SM and the AMR 12.2 functionalities. The identifier for the communication device is located and information can be output to the BS device 104 indicating that only AMR 12.2 functionality can be configured by the BS device 104 for the communication device channel.

In both AMR MM and AMR SM cases, RAB Assignment Request (12.2, 7.45, 5.9, 4.75) can be the standard signaling information sent to the DF component 106. However, the DF component 106 can distinguish between AMR MM and AMR SM by analyzing the IU up version, which can be an additional information element received in the request. If the IU up is version 1 (IUUPV1), the assignment can be AMR SM. If the IU up is version is 2 (IUUPV2), the assignment can be AMR MM.

In one example, the BS 104 and the DF component 106 can communicate with one another with a dedicated protocol IUP (e.g., interface UMTS plane) specialized for signaling called IU Control Plane (cp) and specialized for data IU User Plane (up). The mode for the user plane can be further specialized into mode 1 or mode 2 depending on how the frames are transported and/or decoded. Mode 2 (or version 2) can be the version employed to support AMR MM when specific operations are used (e.g. Transcoder Free Operation). The mode can be independently assigned at the RAB setup. In some embodiments, the information element can be utilized for the mode to have a bi-dimensional variable to send to the DF component 106 to distinguish between AMR MM and AMR SM.

Figure 9:
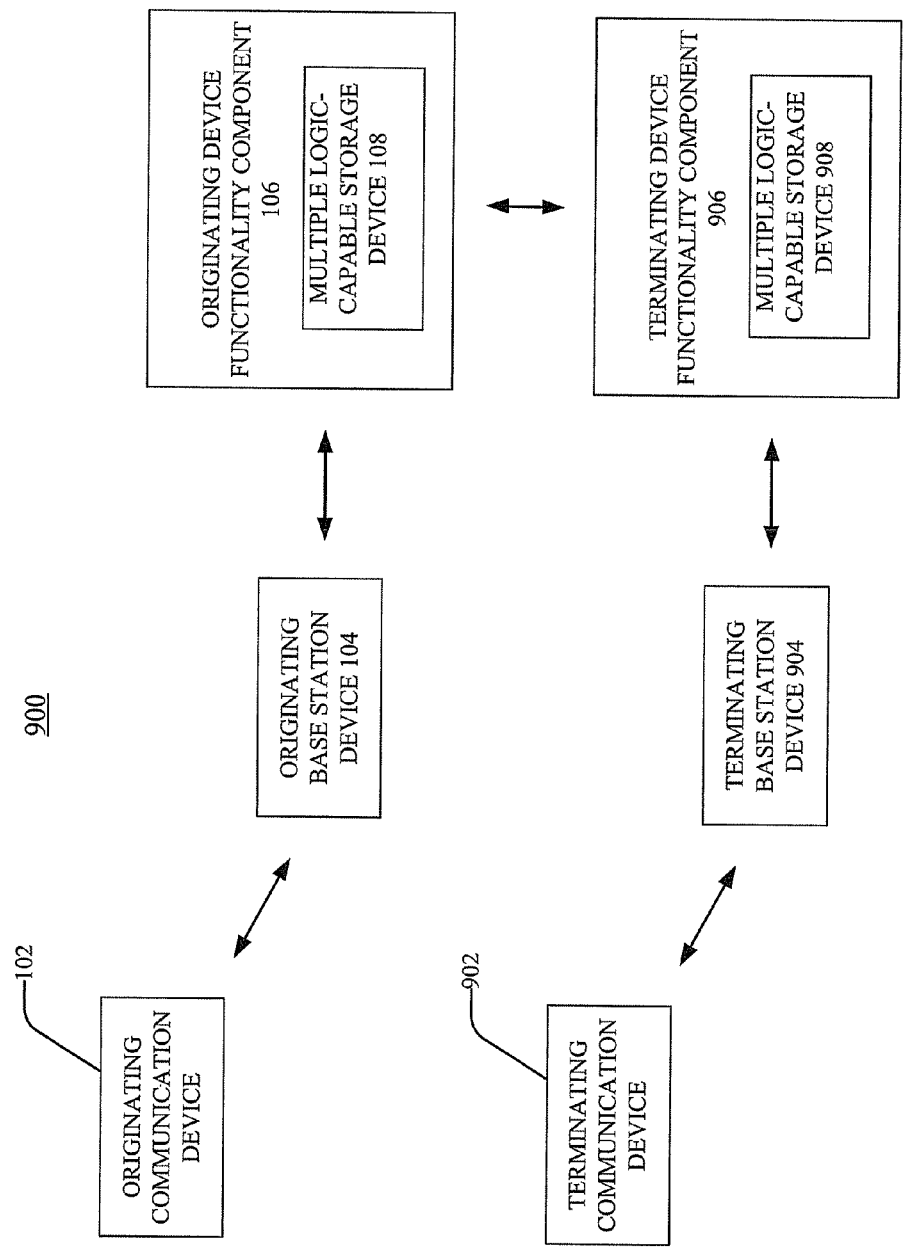
FIG. 9 illustrates an example schematic diagram of another system that facilitates wireless communication network access via MLCS devices in accordance with one or more embodiments described herein.

FIG. 9 illustrates an example schematic diagram of another system that facilitates wireless communication network access via MLCS devices in accordance with one or more embodiments described herein. Repetitive description of like elements employed in other embodiments described herein is omitted for sake of brevity.

System 900 can comprise an originating communication device 102 that can initiate a request to originating BS device 104 for a communication channel to be established to allow the originating communication device 102 to communicate with terminating communication device 902. Terminating communication device 902 can be located geographically remote from MLCS device 108 and originating DF component 106 and thus a separate, additional terminating DF component 906 having a MLCS device 908 can be associated with the terminating communication device 902.

The MLCS device 908 can be scanned (by the MLCS device 908 or the terminating DF component 906) to determine functionality of the terminating communication device 902. As such, upon receipt of a request for communication between the originating communication device 102 and the terminating communication device 902, the originating DF component 106 (or MLCS device 108) can scan the MLCS device 108 to determine the functionality associated with the originating communication device 102 and the terminating DF component (or the MLCS device 908) can scan the MLCS device 108 to determine the functionality associated with the terminating communication device 902. A communication channel can be established that provides the lowest common level of functionality for which each of the communication devices 102, 902 are capable.

Figure 10:
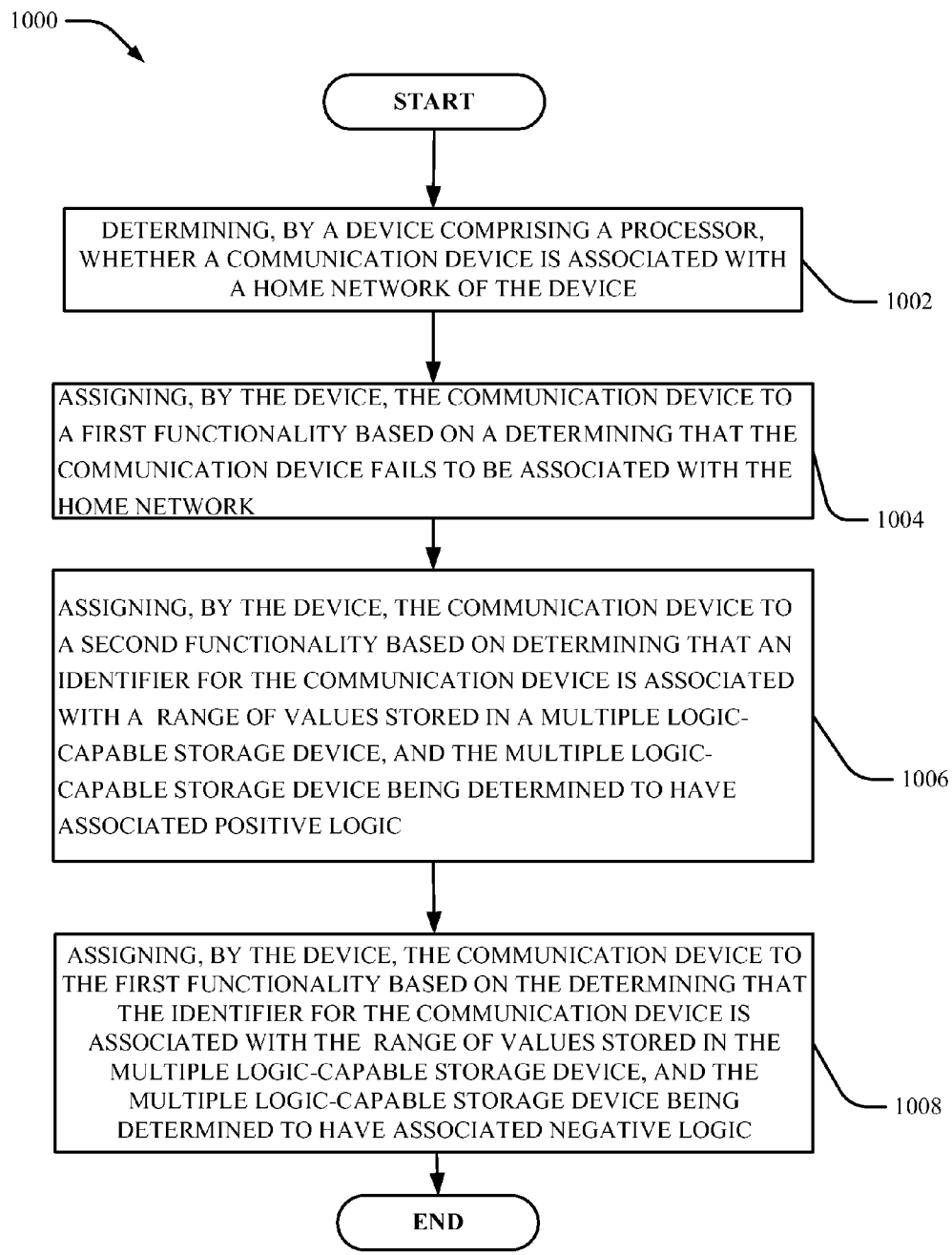
FIGS. 10 and 11 are flowcharts of methods facilitating wireless communication network access via an MLCS device in accordance with one or more embodiments described herein.
Figure 11:
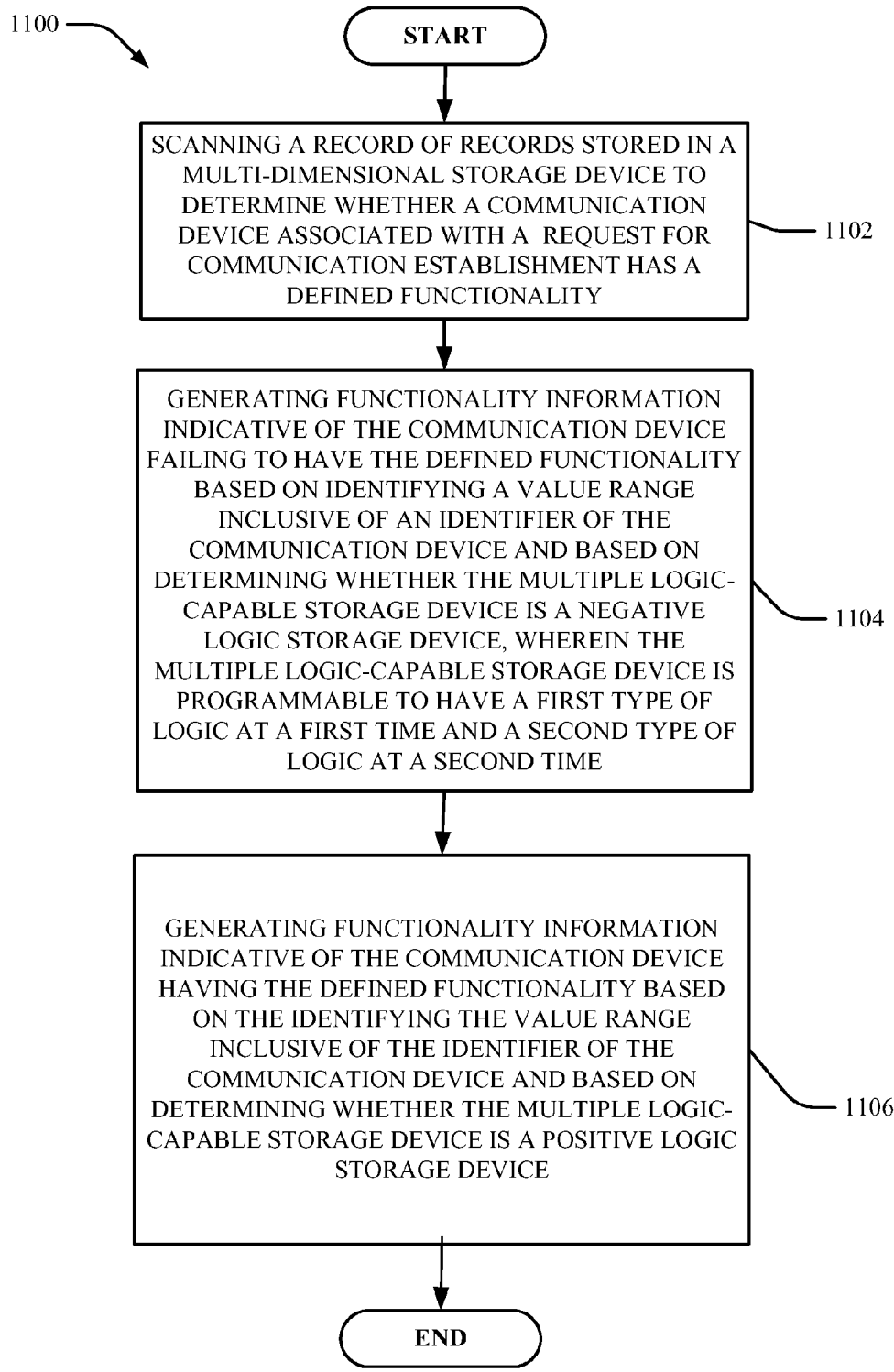

FIGS. 10 and 11 are flowcharts of methods facilitating wireless communication network access via an MLCS device in accordance with one or more embodiments described herein. Repetitive description of like elements employed in other embodiments described herein is omitted for sake of brevity.

Turning first to FIG. 10, at 1002, method 1000 can comprise determining, by a device (e.g., DF component 106) comprising a processor, whether a communication device (e.g., communication device 102) is associated with a home network of the device (e.g., performed by the DF component 106 or the MLCS device 108). For example, the device can determine whether a communication device that requests services and/or establishment of a channel from a BS device (e.g., BS device 104) is a roaming device/roamer affiliated with another network besides the home network (e.g., home network for the DF component to which the BS device communicates) or is a home device for a particular home network with which the device is associated. In some embodiments, a home device/homer can be a device associated with the home network or a device for which the user/owner of the device has a service contract with the service provider for the home network.

At 1004, method 1000 can comprise assigning, by the device, the communication device to a first functionality based on determining that the communication device fails to be associated with the home network (and is therefore a roaming device/roamer) (e.g., performed by the DF component 106 or the MLCS device 108). The first functionality can comprise a low level of functionality in some embodiments. For example, the first functionality can be AMR 12.2 functionality. Accordingly, the BS device can configure a channel for use by the roaming device that provides for AMR 12.2 functionality.

At 1006, method 1000 can comprise assigning, by the device, the communication device to a second functionality based on determining that an identifier for the communication device is associated with a range of values stored in a MLCS device (e.g., MLCS device 108), and the MLCS device has associated positive logic (e.g., performed by the DF component 106 or the MLCS device 108). For example, if the device determines that the communication device is not a roaming device but is associated with the home network, the device can determine if a range of values that comprises an identifier for the communication device is stored in the first MLCS device and, if so, assign the communication device an advanced level of functionality (e.g., AMR MM functionality). The first MLCS device can be programmed to operate according to positive logic.

At 1008, method 1000 can comprise assigning, by the device, the communication device to the first functionality based on determining that the identifier for the communication device is associated with a range of values stored in the MLCS device, and the MLCS device has associated negative logic (e.g., performed by the DF component 106 or the MLCS device 108). For example, if the device determines that the communication device is not a roaming device but is associated with the home network, and the device determines that a range of values that comprises an identifier for the communication device is not stored in the first MLCS device, the device can assign the communication device one of two levels of functionality (e.g., AMR 12.2 functionality or AMR SM functionality). The second MLCS device can be programmed to operate according to negative logic.

In some embodiments, if the device determines that the communication device is not a roaming device but is associated with the home network, and the device determines that a range of values that comprises an identifier for the communication device is not stored in the first MLCS device, the device can assign the communication device the lower level of functionality as between the two levels based on the device determining that the range of values that comprises an identifier for the communication device is stored in a second MLCS device. The device can assign the communication device a higher level of functionality as between the two levels based on the device determining that the range of values that comprises an identifier for the communication device is not stored in the second MLCS device.

Turning now to FIG. 11, at 1102, method 1100 can comprise scanning a record of records stored in a MLCS device (e.g., MLCS device) to determine whether a communication device (e.g., communication device 102) associated with a request for communication establishment has a defined functionality (e.g., performed by the DF component 106). At 1104, method 1100 can comprise generating functionality information indicative of the communication device failing to have the defined functionality based on identifying a value range inclusive of an identifier of the communication device and based on determining whether the multiple logic-capable storage device is a negative logic storage device, wherein the multiple logic-capable storage device is programmable to have a first type of logic at a first time and a second type of logic at a second time (e.g., performed by the DF component 106).

At 1106, method 1100 can comprise generating functionality information indicative of the communication device having the defined functionality based on the identifying the value range inclusive of the identifier of the communication device and based on determining whether the multiple logic-capable storage device is a positive logic storage device (e.g., performed by the DF component 106).

Figure 12:
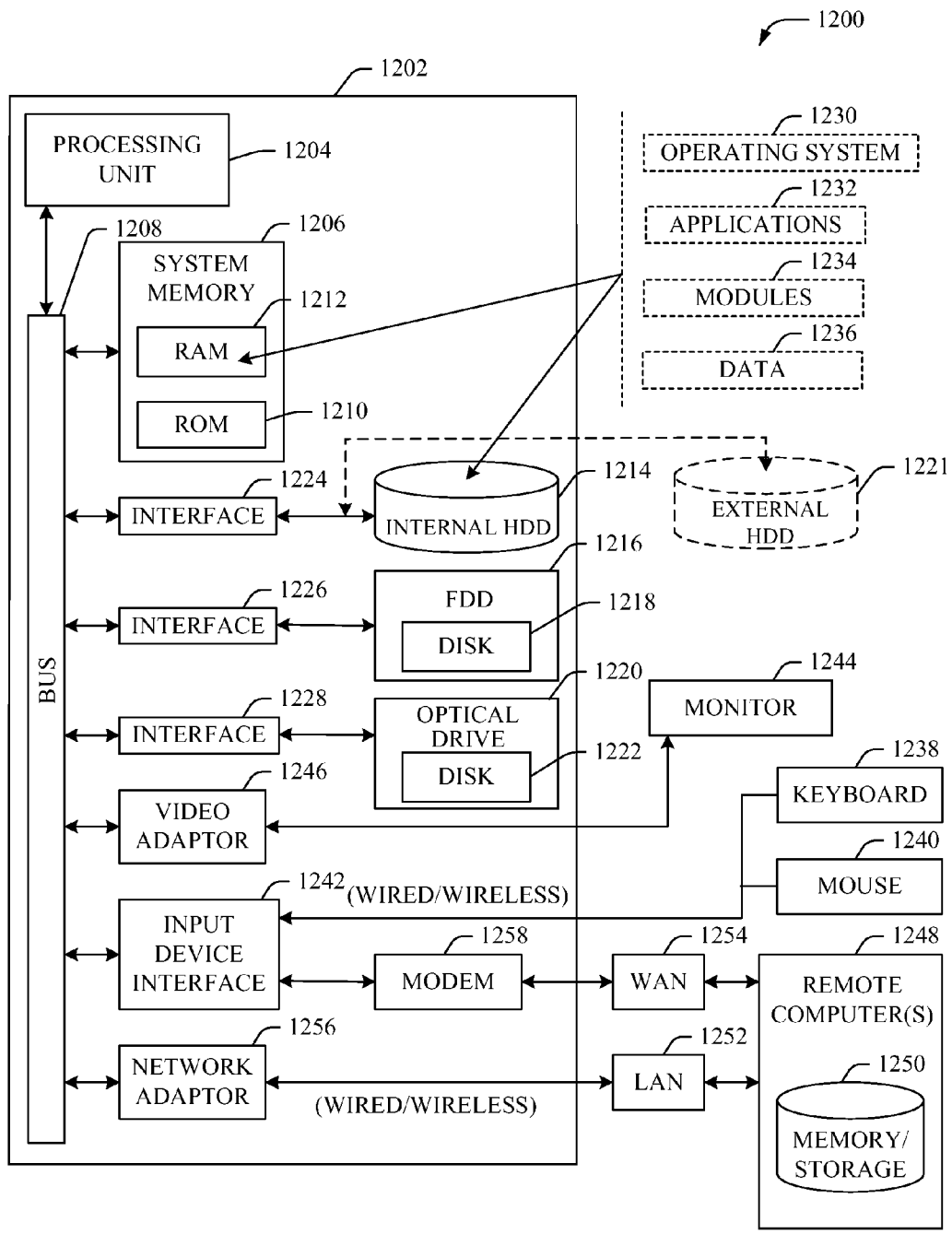
FIG. 12 illustrates a block diagram of a computer that can be employed in accordance with one or more embodiments.

FIG. 12 illustrates a block diagram of a computer that can be employed in accordance with one or more embodiments. Repetitive description of like elements employed in other embodiments described herein is omitted for sake of brevity.

In some embodiments, the computer can be or be included within any number of components described herein comprising, but not limited to, communication device 102, BS device 104, DF component 106 and/or MLCS device 108 (or any components of communication device 102, BS device 104, DF component 106 and/or MLCS device 108).

In order to provide additional text for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data. Tangible and/or non-transitory computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage, other magnetic storage devices and/or other media that can be used to store desired information. Computer-readable storage media can be accessed by one or more local or remote computing devices, e.g., via access requests, queries or other data retrieval protocols, for a variety of operations with respect to the information stored by the medium.

In this regard, the term "tangible" herein as applied to storage, memory or computer-readable media, is to be understood to exclude only propagating intangible signals per se as a modifier and does not relinquish coverage of all standard storage, memory or computer-readable media that are not only propagating intangible signals per se.

In this regard, the term "non-transitory" herein as applied to storage, memory or computer-readable media, is to be understood to exclude only propagating transitory signals per se as a modifier and does not relinquish coverage of all standard storage, memory or computer-readable media that are not only propagating transitory signals per se.

Communications media typically embody computer-readable instructions, data structures, program modules or other structured or unstructured data in a data signal such as a modulated data signal, e.g., a channel wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 12, the example environment 1200 for implementing various embodiments of the embodiments described herein comprises a computer 1202, the computer 1202 comprising a processing unit 1204, a system memory 1206 and a system bus 1208. The system bus 1208 couples system components comprising, but not limited to, the system memory 1206 to the processing unit 1204. The processing unit 1204 can be any of various commercially available processors. Dual microprocessors and other multiprocessor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 comprises ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also comprise a high-speed RAM such as static RAM for caching data.

The computer 1202 further comprises an internal hard disk drive (HDD) 1210 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface, respectively. The interface 1224 for external drive implementations comprises at least one or both of Universal Serial Bus (USB) and Institute of Electrical and Electronics Engineers (IEEE) 1294 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1212, comprising an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

A communication device can enter commands and information into the computer 1202 through one or more wired/wireless input devices, e.g., a keyboard 1238 and a pointing device, such as a mouse 1240. Other input devices (not shown) can comprise a microphone, an infrared (IR) remote control, a joystick, a game pad, a stylus pen, touch screen or the like. These and other input devices are often connected to the processing unit 1204 through an input device interface 1242 that can be coupled to the system bus 1208, but can be connected by other interfaces, such as a parallel port, an IEEE 1294 serial port, a game port, a universal serial bus (USB) port, an IR interface, etc.

A monitor 1244 or other type of display device can be also connected to the system bus 1208 via an interface, such as a video adapter 1246. In addition to the monitor 1244, a computer typically comprises other peripheral output devices (not shown), such as speakers, printers, etc.

The computer 1202 can operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically comprises many or all of the elements described relative to the computer 1202, although, for purposes of brevity, only a memory/storage device 1250 is illustrated. The logical connections depicted comprise wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1252 through a wired and/or wireless communication network interface or adapter 1256. The adapter 1256 can facilitate wired or wireless communication to the LAN 1252, which can also comprise a wireless AP disposed thereon for communicating with the wireless adapter 1256.

When used in a WAN networking environment, the computer 1202 can comprise a modem 1258 or can be connected to a communications server on the WAN 1254 or has other means for establishing communications over the WAN 1254, such as by way of the Internet. The modem 1258, which can be internal or external and a wired or wireless device, can be connected to the system bus 1208 via the input device interface 1242. In a networked environment, program modules depicted relative to the computer 1202 or portions thereof, can be stored in the remote memory/storage device 1250. It will be appreciated that the network connections shown are example and other means of establishing a communications link between the computers can be used.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a defined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a femto cell device. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10 Base T wired Ethernet networks used in many offices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of an acquired network. A classifier is a function that maps an input attribute vector, x=(x1, x2, x3, x4, . . . , xn), to a confidence that the input belongs to a class, that is, f(x)=confidence(class). Such classification can employ a probabilistic and/or statistical-based analysis (e.g., factoring into the analysis utilities and costs) to prognose or infer an action that a communication device desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing communication device behavior, operator preferences, historical information, receiving extrinsic information). For example, SVMs can be configured via a learning or training phase within a classifier constructor and feature selection module. Thus, the classifier(s) can be used to automatically learn and perform a number of functions, comprising but not limited to determining according to a predetermined criteria which of the acquired cell sites will benefit a maximum number of subscribers and/or which of the acquired cell sites will add minimum value to the existing communication network coverage, etc.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of communication device equipment. A processor can also be implemented as a combination of computing processing units.

As used herein, terms such as "data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can comprise both volatile and nonvolatile memory.

Memory disclosed herein can comprise volatile memory or nonvolatile memory or can comprise both volatile and nonvolatile memory. By way of illustration, and not limitation, nonvolatile memory can comprise read only memory (ROM), programmable ROM (PROM), electrically programmable ROM (EPROM), electrically erasable PROM (EEPROM) or flash memory. Volatile memory can comprise random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to comprise, without being limited to, these and any other suitable types of memory.

What has been described above comprises mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-readable storage device storing executable instructions that, in response to execution, cause a system comprising a processor to perform operations, comprising:
    scanning a record of records stored in a multiple logic-capable storage device to determine whether a communication device associated with a request for communication establishment has a defined functionality; and
    generating functionality information indicative of the communication device failing to have the defined functionality based on identifying a value range inclusive of an identifier of the communication device and based on determining whether the multiple logic-capable storage device is a negative logic storage device, wherein the multiple logic-capable storage device is programmable to have a first type of logic at a first time and a second type of logic at a second time.

2. The computer-readable storage device of claim 1, wherein the functionality information is first functionality information, and wherein the operations further comprise:
    generating second functionality information indicative of the communication device having the defined functionality based on the identifying the value range inclusive of the identifier of the communication device and based on determining whether the multiple logic-capable storage device is a positive logic storage device.

3. The computer-readable storage device of claim 1, wherein the first type of logic is negative logic and the second type of logic is positive logic.

4. The computer-readable storage device of claim 1, wherein the request is received by the system from a base station device communicatively coupled to the system.

5. The computer-readable storage device of claim 4, wherein the operations further comprise:
    transmitting, to the base station device, assignment information indicative of a configuration for a channel for the communication establishment, and wherein the assignment information is based on the functionality information.

6. The computer-readable storage device of claim 1, wherein the records of the multiple logic-capable storage device comprise information indicative of functionalities of which communication devices are capable.

7. The computer-readable storage device of claim 6, wherein a functionality of the functionalities comprises an adaptive multi-rate functionality.

8. The computer-readable storage device of claim 6, wherein a functionality of the functionalities comprises an adaptive multi-rate single mode functionality.

9. The computer-readable storage device of claim 6, wherein a functionality of the functionalities comprises an adaptive multi-rate multi mode functionality.

10. The computer-readable storage device of claim 6, wherein a functionality of the functionalities comprises a voice over Internet protocol functionality.

11. A method, comprising:
determining, by a device comprising a processor, whether a communication device is associated with a home network of the device;
responsive to a first determination that the communication device fails to be associated with the home network, assigning, by the device, the communication device to a first functionality;
responsive to a second determination that an identifier for the communication device is associated with a range of values stored in a multiple logic-capable storage device, and based on determining whether the multiple logic-capable storage device has associated positive logic, assigning, by the device, the communication device to a second functionality; and
responsive to a third determination that the identifier for the communication device is associated with the range of values stored in the multiple logic-capable storage device, and based on determining whether the multiple logic-capable storage device has associated negative logic, assigning, by the device, the communication device to the first functionality.

12. The method of claim 11, further comprising:
responsive to a fourth determination that the identifier for the communication device fails to be associated with another range of values stored in a negative logic portion of the multiple logic-capable storage device, assigning, by the device, the communication device to a third functionality.

13. The method of claim 12, wherein the assigning the communication device to the third functionality comprises assigning the communication device to an adaptive multi-rate single mode functionality.

14. The method of claim 11, wherein the assigning the communication device to the first functionality comprises assigning the communication device to an adaptive multi-rate functionality.

15. The method of claim 11, wherein the assigning the communication device to the second functionality comprises assigning the communication device to an adaptive multi-rate multi mode functionality.

16. A system, comprising:
a processor; and
a memory that stores executable instructions that, when executed by the processor, facilitate performance of operations, comprising:
identifying a defined functionality of a communication device of communication devices; and
determining to store information about the communication device in a first storage location or a second storage location of a multi-dimensional data storage system based on whether the defined functionality satisfies a defined condition,
wherein the determining comprises determining to store the information in the first storage location based on the defined functionality satisfying the defined condition, and based on determining that the first storage location has associated positive logic, and
wherein the determining comprises determining to store the information in the second storage location based on the defined functionality satisfying the defined condition, and based on determining that the second storage location has associated negative logic.

17. The system of claim 16, wherein the first storage location and the second storage location are selectively associated with the positive logic or the negative logic based on a likelihood of reducing a resultant number of the communication devices predicted to be stored in the first storage location or the second storage location.

18. The system of claim 17, wherein the information comprises first information indicative of a model number associated with the communication device and second information indicative of a version of software associated with the communication device.

19. The system of claim 18, wherein the first information is concatenated with the second information.

20. The system of claim 16, wherein the defined condition comprises the defined functionality being capable of adaptive multi-rate multi mode functionality.

* * * * *